US012777322B2

(12) United States Patent
Tang et al.

(10) Patent No.: US 12,777,322 B2
(45) Date of Patent: Oct. 27, 2026

(54) METHODS AND APPARATUS OF NETWORK CONTROLLED SMALL GAP CONFIGURATION IN NR

(71) Applicant: MediaTek Singapore Pte. Ltd., Singapore (SG)

(72) Inventors: Zhixun Tang, Beijing (CN); Tsang-Wei Yu, Hsinchu (TW)

(73) Assignee: MediaTek Singapore Pte. Ltd., Singapore (SG)

(*) Notice: Subject to any disclaimer, the term of this patent is extended or adjusted under 35 U.S.C. 154(b) by 516 days.

(21) Appl. No.: 18/346,817

(22) Filed: Jul. 4, 2023

(65) Prior Publication Data

US 2024/0007845 A1 Jan. 4, 2024

Related U.S. Application Data

(63) Continuation of application No. PCT/CN2021/141576, filed on Dec. 27, 2021, which (Continued)

(30) Foreign Application Priority Data

Jan. 4, 2021 (WO) ................ PCT/CN2021/070160
Dec. 27, 2021 (WO) ................ PCT/CN2021/141576

(51) Int. Cl.
*H04W 8/22* (2009.01)
*H04W 16/28* (2009.01)

(52) U.S. Cl.
CPC ............. *H04W 8/22* (2013.01); *H04W 16/28* (2013.01)

(58) Field of Classification Search
CPC ................................ H04W 8/22; H04W 16/28
See application file for complete search history.

(56) References Cited

U.S. PATENT DOCUMENTS

2018/0076872 A1* 3/2018 Li ........................ H04B 7/0626
2019/0364469 A1* 11/2019 Siomina ............ H04W 36/0085
(Continued)

FOREIGN PATENT DOCUMENTS

CN 108366379 A 8/2018

OTHER PUBLICATIONS

China Patent Office Action for Application# 202180081838.6date Dec. 5, 2025 (No English Translation Available).

*Primary Examiner* — Michael Thier
*Assistant Examiner* — Tracy Lauren Raimondo
(74) *Attorney, Agent, or Firm* — Helen Mao; Imperium Patent Works

(57) ABSTRACT

Apparatus and methods are provided for network controlled small gap (NCSG) configuration. In one novel aspect, the UE sends UE NCSG capability reports to the wireless network, receives a network NCSG configuration, which is based on the UE NCSG capability reports, and performs one or more measurements. In one embodiment, the UE NCSG capability report indicates whether the NCSG is supported by the UE, further includes the band combination for supported NCSG. In another embodiment, UE NCSG capability report further comprises a beam management type for each corresponding frequency band in frequency range-2 (FR2). The network NCSG configuration is received from a master node or a secondary node. In another embodiment, one configured NCSG overlaps with a configured measurement gap of the UE, the UE prioritizes the overlapped measurement gap or the NCSG based on predefined rules or information for the network.

18 Claims, 9 Drawing Sheets

Related U.S. Application Data is a continuation of application No. PCT/CN2021/070160, filed on Jan. 4, 2021.

(56) References Cited

U.S. PATENT DOCUMENTS

| | | | | |
|---|---|---|---|---|
| 2020/0084677 | A1 | 3/2020 | Yiu | |
| 2021/0250947 | A1* | 8/2021 | Ryu | H04L 5/0096 |
| 2021/0410024 | A1* | 12/2021 | Tang | H04W 36/0088 |
| 2022/0078813 | A1* | 3/2022 | Miao | H04W 36/0088 |
| 2022/0279402 | A1* | 9/2022 | Zheng | H04W 36/0088 |
| 2023/0055487 | A1* | 2/2023 | Jin | H04W 76/16 |

* cited by examiner

| CC | B1 | B2 | B3 | B4 | B5 | B6 |
|---|---|---|---|---|---|---|
| B1+B2 (P&S) | 1 | 0 | 0 | 0 | 2 | 2 |

A NEW INDICATION FOR NCSG

281

| CC | B1 | B2 | B3 | B4 | B5 | B6 |
|---|---|---|---|---|---|---|
| B1+B2 (P&S) | 1 | 0 | 1 | 1 | 0 | 0 |

NO GAP IN "NEED-FOR-GAP" MEANS NCSG

282

| CC | B1 | B2 | B3 | B4 | B5 | B6 |
|---|---|---|---|---|---|---|
| B1+B2 (P&S) | 1 | 2 | 0 | 0 | 2 | 2 |
| | | CBM | CBM | IBM | IBM | CMB |

BEAM MANAGEMENT TYPE INCLUDED FOR FR2

283

| FREQUENCY LAYER | PCC | SCC | INTER-FREQUENCY WITH NCSG | E-UTRA INTER-RAT WITH NCSG |
|---|---|---|---|---|
| **CSSF_ OUTSIDE.GAP** | 1 | 2(SCC) + 2 (INTER-F WITH NCSG) | 2(SCC) + 2 (INTER-F WITH NCSG) | • IF SCC!=0 Ceiling{4(overall scaling frequencies)/2(SCCnumber)} * 1(inter-RAT with NCSG number)<br>• IF SCC=0 INTER-FREQUENCY WITH NCSG NUMBER + INTER-RAT WITH NCSG NUMBER |

670

NCSG GAP COLLIDING WITH SSB
700

| | NCSG | SMTC | L1 MEASUREMENT |
|---|---|---|---|
| NCSG | - | - | - |
| SMTC | • INTRA-BAND<br>  • NO<br>• INTER-BAND<br>  • IBM – YES<br>  • CBM - NO | - | - |
| L1 MEASUREMENT | • INTRA-BAND<br>  • NO<br>• INTER-BAND<br>  • IBM – YES<br>  • CBM - NO | CANNOT PERFORM TOGETHER | - |

730

METHODS AND APPARATUS OF NETWORK CONTROLLED SMALL GAP CONFIGURATION IN NR

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/141576, titled "Methods and apparatus of Network Controlled Small Gap in NR,", filed Dec. 27, 2021. PCT/CN2021/141576, in turn, claims priority under 35 U.S.C. § 120 and § 365(c) from International Application No PCT/CN2021/070160, titled "Methods and apparatus of Network Controlled Small Gap in NR," with an international filing date of Jan. 4, 2021. The disclosure of each of the foregoing documents is incorporated herein by reference.

TECHNICAL FIELD

The disclosed embodiments relate generally to wireless communication, and, more particularly, to methods and apparatus for network controlled small gap (NCSG) configuration.

BACKGROUND

Mobile networks communication continues to grow rapidly. The mobile data usage will continue skyrocketing. New data applications and services will require higher speed and more efficient. Large data bandwidth application continues to attract more consumers. The efficiency and quick adaptation of new standards are key to the mobile network. With the rapid development of the mobile network, the design of measurement gap, which suspends communication to give the mobile stations a gap period to perform measurement, requires more flexibility and efficiency.

In the current new radio (NR) system, only single measurement gap (MG) pattern can be configured within one measurement period for single UE if the UE supports per-UE MG only, or single frequency range (FR) if the UE supports per-FR MG. The measurement gap length (MGL) will be 3 ms, 4 ms, 6 ms in FR1 and 2.5 ms, 3.5 ms, 5.5 ms in FR2. When UE supports carrier aggregation (CA)/dual connectivity (DC), the UE may have additional RF chains which are not configured. These additional RF chains can be used to perform measurements. Measurements for target intra-frequency, inter-frequency, or Inter-radio access technology (RAT) may not use MG once the UE supports related band combination and has additional RF chains during the measurements. Although no measurement gap is needed, the additional interruption is still there due to RF power on/off before or after the measurement occasions, such as synchronization signal block (SSB)-based Measurement Timing configuration (SMTC) window. The visible interruption length (VIL) can be only 0.5 ms for FR1 and 0.25 ms for FR2. To support concurrent measurements, network control small gap (NCSG) is needed. The configuration of NCSG needs to be addressed to adapt to the large possible configurations of the UE.

Improvements and enhancements are required to configure and perform measurements more efficiently.

SUMMARY

Apparatus and methods are provided for network controlled small gap (NCSG) configuration. In one novel aspect, the UE sends UE NCSG capability reports to the wireless network, receives a network NCSG configuration, which is based on the UE NCSG capability reports, and performs one or more measurements based on the one or more NCSG for the corresponding measuring frequency bands. In one embodiment, the UE NCSG capability report indicates whether the NCSG is supported by the UE. The UE NCSG capability reports further include the band combination for supported NCSG. The UE NCSG capability report is based on the current configured one or more frequency layers of the UE and indicates whether NCSG is needed for one or more measuring frequency layers. In yet another embodiment, UE NCSG capability report further comprises a beam management type for each corresponding frequency alyer in frequency range-2 (FR2). The network NCSG configuration is received from a master node (MN) base station or a secondary node (SN) base station. In one embodiment, the UE performs intra-frequency measurements or a L1 measurement without gap in parallel with one or more measurements for inter-frequency layers within corresponding configured NCSG when corresponding frequency layers belong to FR1 or independent beam management (IBM) bands on FR2. In one embodiment, one configured NCSG overlaps with a configured measurement gap of the UE, the UE receives a radio resource control (RRC) signal indicating priority information for the overlapped measurement gap and the NCSG. In another embodiment, one configured NCSG overlaps with a configured measurement gap of the UE, the UE prioritizes the overlapped measurement gap and the NCSG based on predefined rules.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
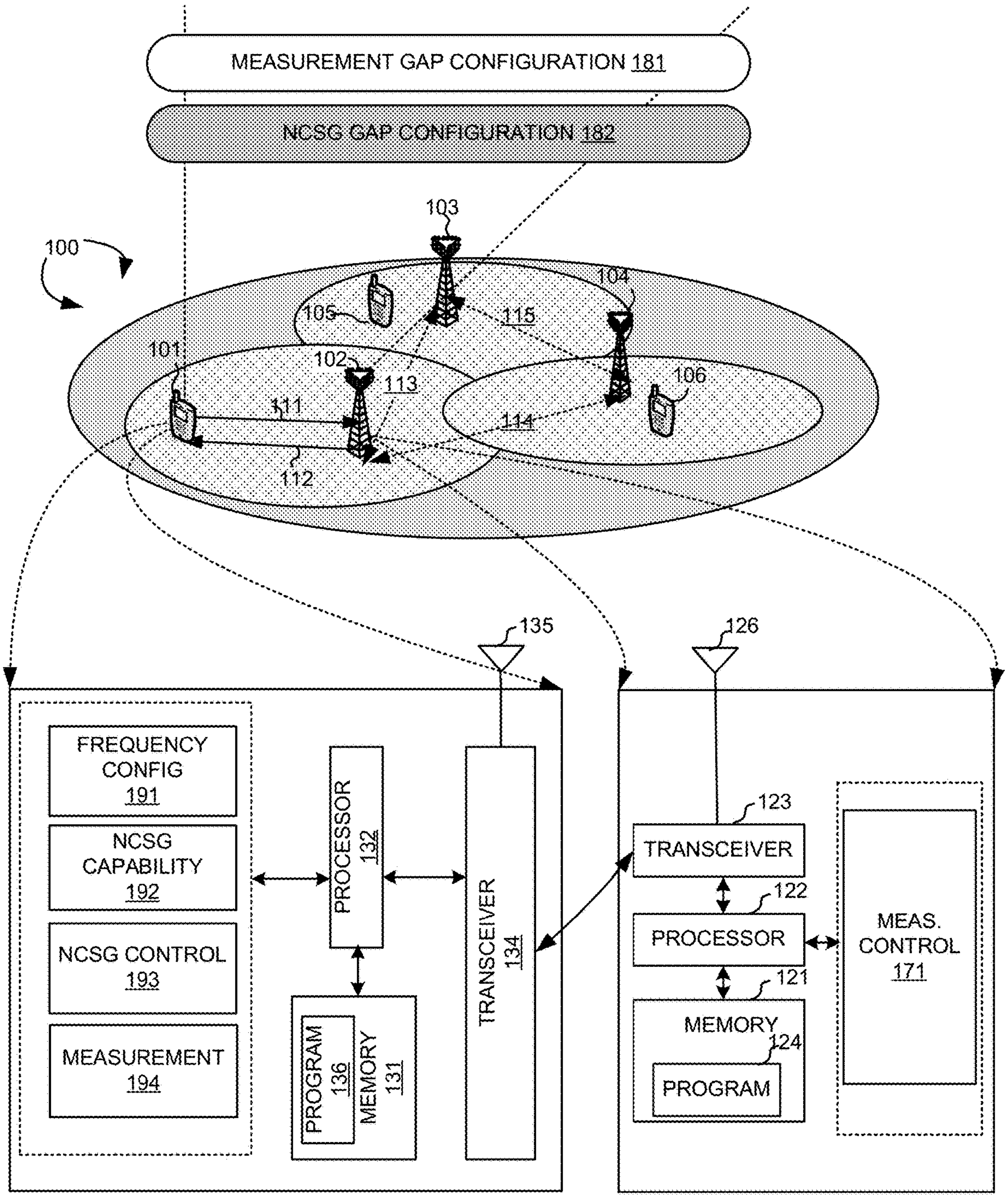
FIG. 1 illustrates a system diagram of a wireless network with NCSG.

FIG. 1 illustrates a system diagram of a wireless communication system 100 with NCSG. Wireless communication system 100 includes one or more wireless networks. Each of the wireless communication network has fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, a gNB, or by other terminology used in the art. The base unit can be an implementation of a gNB in New Radio (NR) of a fifth generation (5G) system. The 5G NR is a radio interface specified in communication standards developed by the 3rd Generation Partnership Project (3GPP). Each of the base unit 102, 103, and 104 serves a geographic area. The base unit performs beamforming in the NR network. Xn interface connections 113, 114 and 115 connect the non-co-located receiving base units, such as 102, 103, and 104. These connections can be either ideal or non-ideal.

A wireless communications device 101 in wireless communication system 100 is served by base station 102 via uplink 111 and downlink 112. Other UEs 105 and 106 are served by different base stations. UE 105 is served by base station 103. UE 106 is served by base station 104. When UE 101 supports the new capability of NCSG, the UE 101 is configured to perform measurement by a NCSG configuration 182 from base station 102. Accordingly, measurement gap configuration 181 and NCSG configuration 182 can be configured between the UE 101 and the base station 102. Depending on capability of the UE 101, different gap patterns can be configured.

FIG. 1 further shows simplified block diagrams of wireless device/UE 101 and base station 102 in accordance with the current invention.

Base station 102 has an antenna 126, which transmits and receives radio signals. A RF transceiver module 123, coupled with the antenna 126, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a measurement control circuit 171 that receives UE NCSG capability report, configures NCSG, and communicates with UEs to implement the NCSG measurement gap functions.

UE 101 has an antenna 135, which transmits and receives radio signals. A RF transceiver module 134, coupled with the antenna 135, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. These control modules can be implemented in software, firmware, and hardware. A frequency configuration module 191 configures one or more frequency bands in a wireless network. An NCSG capability module 192 sends a UE NCSG capability report to the wireless network based on the configured one or more frequency bands, wherein the UE NCSG capability report indicates whether NCSG is needed for one or more measuring frequency layers. An NCSG control module 193 receives a network NCSG configuration from the wireless network, wherein one or more NCSGs are configured for corresponding frequency layers that are indicated as need-for-NCSG in the UE NCSG capability report. A measurement module 194 performs one or more measurements based on the one or more NCSGs for the corresponding measuring frequency layers.

Figures 2A, 2B:
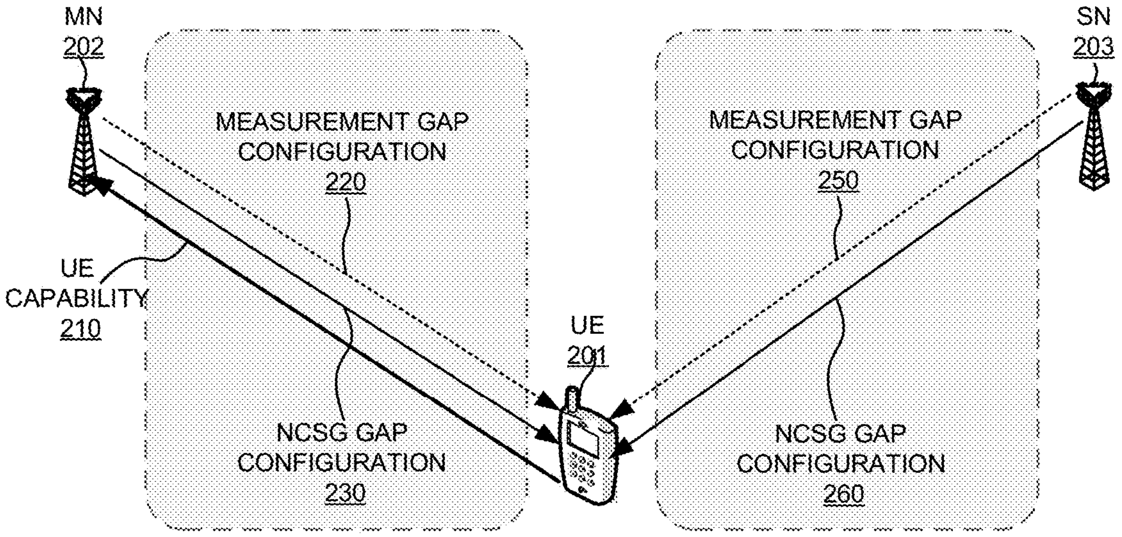
FIG. 2A illustrates a top-level flow diagram of the NCSG capability reporting, NCSG configuration and MG configuration.
FIG. 2B illustrates exemplary diagrams for the UE NCSG capability report.

FIG. 2A illustrates a top-level flow diagram of the NCSG capability reporting, NCSG configuration and MG configuration. A UE 201 is connected with a wireless network configured with DC, which increases data throughput for UE 201. In one embodiment, UE 201 is connected with a master node (MN) 202 and a secondary node (SN) 203. In one novel aspect, UE 201 sending a UE NCSG capability report to the wireless network whether NCSG is needed for one or more measuring frequency layers. The UE receives a NCSG configuration from the wireless network and performs measurement accordingly.

In one embodiment, at step 210, UE 201 sends a UE NCSG capability report to MN 202. In one embodiment, the UE NCSG capability report indicates whether the NCSG is supported by the UE. The UE NCSG capability reports further include the band combination for supported NCSG. The UE NCSG capability report is based on the current configured one or more frequency layers of the UE and indicates whether NCSG is needed for one or more measuring frequency layers. In NR system, due to hardware limitation, UE can only support two searchers (two separate resources) for NR measurements. Although UE supports NCSG for some NR bands, UE can only measure at most two NR frequencies at a time. However, there is no limitation for inter-RAT measurements. Thus, UE can measure an additional inter-RAT with NR serving cell measurements at a time. For example, when UE performs intra-frequency measurements for primary cell (PCell) and one secondary cell (SCell), the inter-RAT frequency which belongs to a NCSG band can be measured at the same time. The benefit for NCSG is the network (NW) can still schedule data for active serving cells when UE perform measurements for these NCSG frequency layers. When there is no measurement gap configured among PCell and SCell(s), the NW can explicitly provide a single NCSG pattern with constant repetition period for UE. However, when there is still measurement gap configured for some frequency layers' measurements, if NW doesn't know whether UE will use NCSG or measurement gap to measure the frequency, NW has to schedule the measurement gap. To optimize data scheduling in NCSG, NW shall dedicatedly know the time occasions where UE will perform measurement by using legacy measurement gap or NCSG.

In one embodiment, the NW first configures one or more measurement gaps for UE through either MN 202 at step 220, or through SN 203 at step 250. When UE 201 sends the NCSG capability report at step 230, the NW configures NCSG patterns for NCSG frequency layers' measurements, including the frequency layers to be measured in the NCSG.

In one novel aspect, the UE NCSG capability report is updated dynamically based on the current configured one or more frequency layers. The one or more measuring frequency layers are a subset of the possible configurations for the UE.

FIG. 2B illustrates exemplary diagrams for the UE NCSG capability report. When NCSG is enabled, UE reports the capability on the supporting gap patterns for NCSG to the MN. In one embodiment 281, the UE NCSG capability report uses a new indication bit for claiming NCSG for one or more frequency bands. For example, for frequency bands B5 and B6 with configured band B1 and band B2 as PCell and SCell, the UE NCSG capability report sets the indication for bands B5 and B6 as '2' to represent that gap is not needed but interruption is still needed. In another embodiment 282, the UE sending the NCSG capability report in the "NeedForGap" signaling framework by indicating 'no gap' for B5 and B6. The 'no gap' indication as shown in 282 indicates NCSG based on the context of the frequency configuration of the UE because switching unused RF chains for measurements may cause interruption to other configured CCs, such as bands B1 and B2. The NCSG capability report using the "NeedForGap" signaling framework sets the indicator to be 'no gap' to indicate the NCSG capability. '0' indicates gap is not needed but with interruption, which indicates the NCSG. '1' indicates gap is needed.

In another embodiment 283, UE NCSG capability report further comprises a beam management type for each corresponding frequency band. In one embodiment, the beam management types are independent beam management (IBM) and common beam management (CBM). A potential issue for UE's NCSG capability reporting is how to explain the meaning for multiple bands reporting. Although UE reports to support multiple bands with NCSG, the inter-frequency measurement in these bands can be 'only interruption' to active serving cells. Owing to the UE RF implementation between bands, UE cannot guarantee that the inter-frequencies' measurement for these related bands has no impact between each other. Thus, UE cannot measure multiple inter-frequencies per measurement gap even though UE reports NCSG for related bands. The UE is not expected to measure 2 inter-frequencies/RAT layers in parallel even if UE reports the support of NCSG to both corresponding bands. It is assumed only one inter-frequency layer or inter-RAT frequency will be measured in each measurement occasion and no prioritization among layers with NCSG. In FR1, owing to using the omnidirectional antennas, UE can receive data or perform L1/L3 intra-frequency measurement together with inter-frequency measurements for the bands which UE claims to support NCSG. In FR2, when UE reports to support NCSG for some bands, whether UE can measure the frequencies in these bands together with receiving data or performing measurement in active serving cells still depends on the Rx beam reception.

In one embodiment, for FR2 intra-band, it shall assume UE will use the same Rx beam to receive the signals at a time. UE cannot simultaneously receive data or perform L1 measurement together with L3 measurement by NCSG because UE shall use fine beam to receive the data/perform L1 measurement but use rough beam to perform L3 measurement. The UE cannot perform L3 measurement for both intra-frequency and inter-frequency because UE can only receive the signal from one Rx beam at a time, but intra-frequency SMTC and inter-frequency SMTC may come from different directions. Although UE has additional RF chains, UE may still not receive the data, perform L1 or L3 measurement for active serving cells and measure the inter-frequency for related intra-bands in parallel. For FR2 inter-band which only supports CBM, the scenario will be similar as FR2 intra-band. The UE may still not receive the data, perform L1 or L3 measurement for active serving cells and measure the inter-frequency for related inter-bands in parallel because UE will use the same Rx beam to receive the signals for these bands, which have the active serving cells. For FR2 inter-band which supports IBM, UE can receive the data from these two bands with independent Rx beams. When UE claims NCSG for these FR2 bands, UE can receive data, perform L1 or intra-frequency L3 measurement together with inter-frequency L3 measurement for these bands. When the UE reports the band which supports NCSG, it shall also report which type of beam management it will use in this band. Other UE NCSG capability report forms can also be used to indicate, dynamically, NCSG capabilities for the frequency bands/layers based on the frequency configuration.

Figure 3:
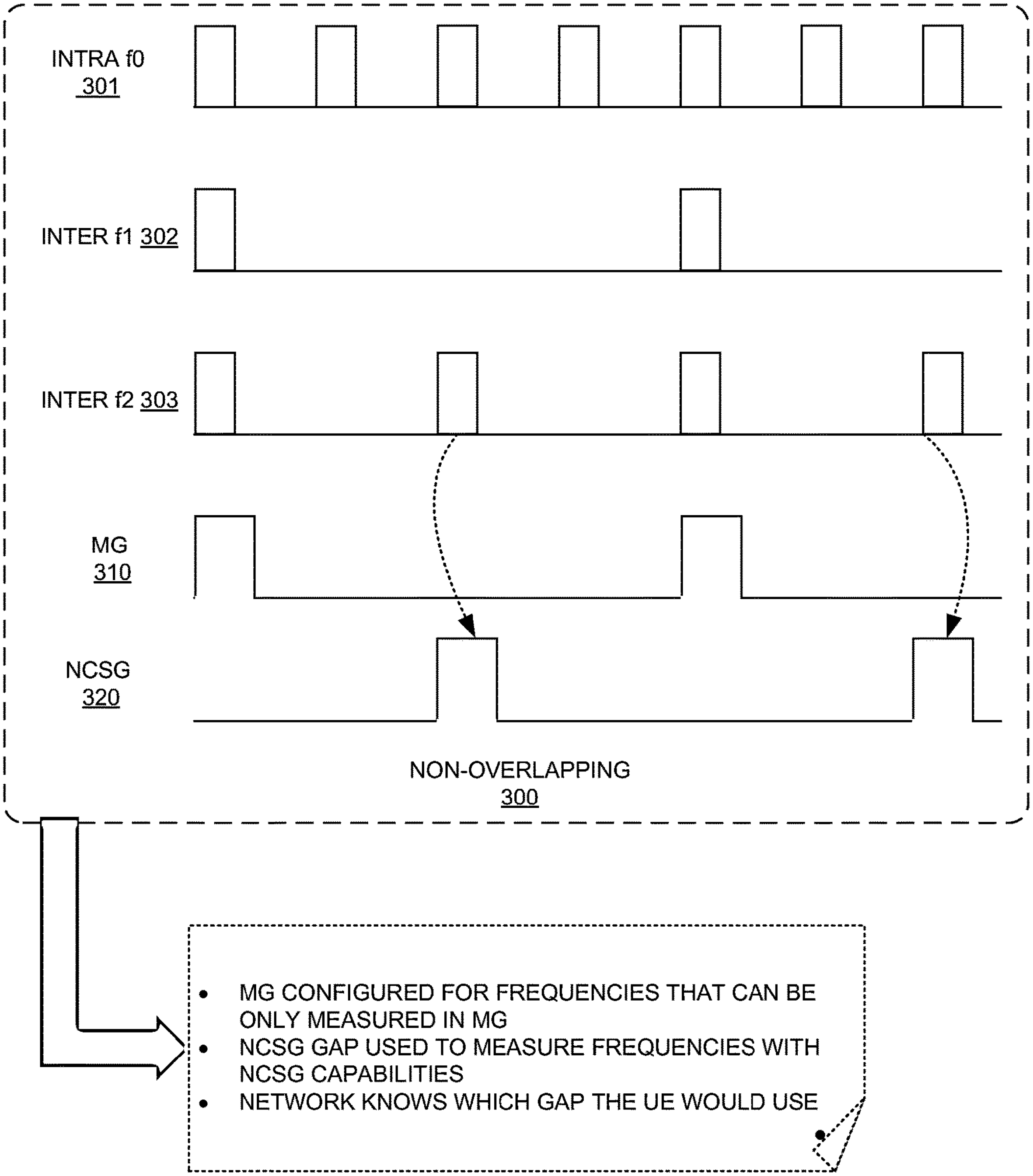
FIG. 3 illustrates exemplary diagrams of NCSG being fully non-overlapping the MG.

FIG. 3 illustrates exemplary diagrams 300 of NCSG being fully non-overlapping with the MG. Intra frequency f0 301, inter frequency f1 302 and inter frequency f2 303 have different SSB periodicities. Measurement gap MG 310 and NCSG 320 are configured with different offsets to cover intra frequency f0 301, inter frequency f1 302, and inter frequency f2 303. MG 310 and NCSG 320 are non-overlapping. The MG are configured for frequencies that can only be measured in the MG, such as inter frequency f1 302. NCSGs, such as NCSG 320 are configured to measure the frequencies with NCSG capabilities, such as inter frequency f2 303. Since MG 310 and NCSG 320 are non-overlapping, both the NW and the UE know which frequency layers are measured in the NCSG. The UE will use NCSG to measure the frequencies with NCSG capabilities. Other frequency layers will only be measured in measurement gap.

Figure 4:
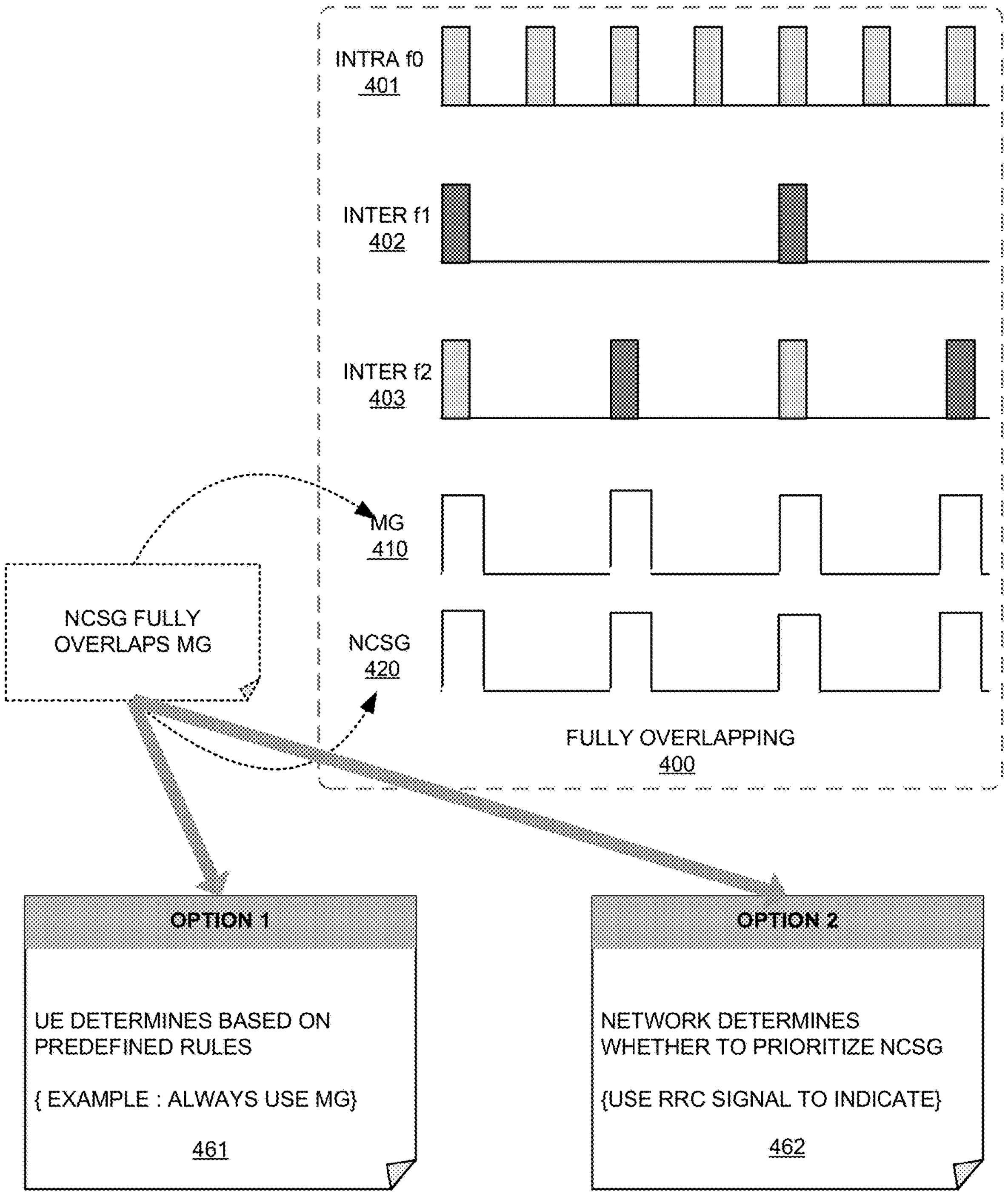
FIG. 4 illustrates exemplary diagrams of NCSG being fully overlapping with MG.

FIG. 4 illustrates exemplary diagrams 400 of NCSG being fully overlapping with MG. Intra frequency f0 401, inter frequency f1 402 and inter frequency f2 403 have different SSB periodicities. Measurement gaps MG 410 and NCSG 420 are configured with different offset to cover intra frequency f0 401, inter frequency f1 402, inter frequency f2 403. MG 410 and NCSG 420 are fully overlapping. In one embodiment 461, the UE determines the priority of the overlapping MG and NCSG based on one or more predefined/preconfigured rules, such as always uses MG. In one embodiment, the legacy MG 410 has the highest priority because some frequencies can only be measured in legacy gap. The frequencies with NCSG capability can be measured either in legacy gap or NCSG. The UE will always use MG to measure the frequency layers when NCSG and traditional MG cannot be split. In another embodiment 462, the network determines whether to perform NCSG. To maximize the benefits of NCSG, the NW may control whether NCSG shall be prioritized sometimes even though NCSG is fully overlapping with legacy gap. In this scenario, the NW uses an RRC signaling to indicate which gap shall be prioritized when NCSG is colliding with legacy measurement gap, such as prioritize legacy measurement gap or NCSG. The UE receives an RRC signaling indicating priority information for the overlapped measurement gap and the NCSG.

Figure 5:
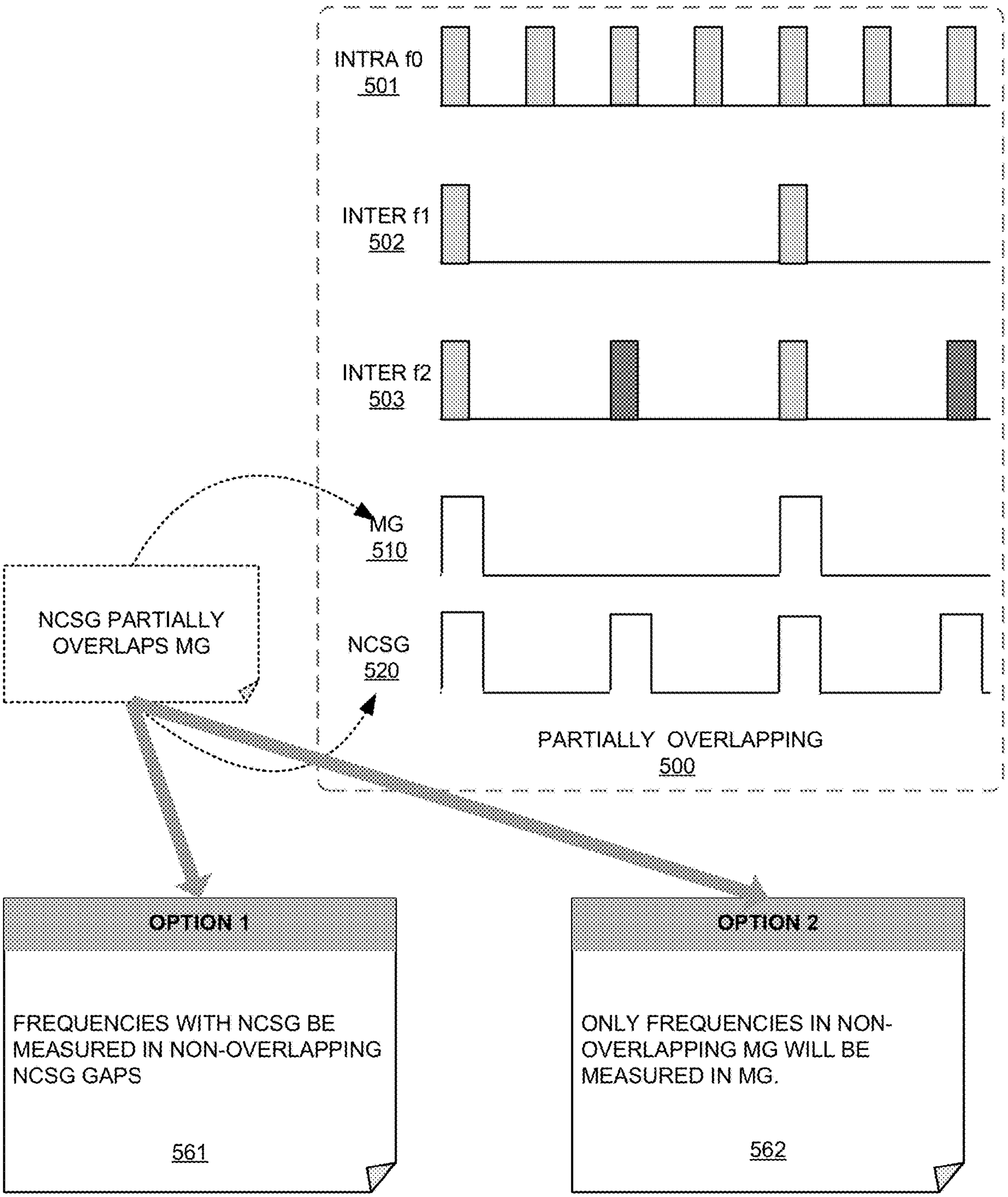
FIG. 5 illustrates exemplary diagrams of NCSG being partially overlapping with MG.

FIG. 5 illustrates exemplary diagrams 500 of NCSG being partially overlapping with MG. Intra frequency f0 501, inter frequency f1 502 and inter f2 frequency 503 have different SSB periodicities. Measurement gaps MG 510 and NCSG 520 are configured with different offset to cover intra frequency f0 501, inter frequency f1 502, inter frequency f2 503. MG 510 and NCSG 520 are partially overlapping. In one embodiment 561, the frequencies with NCSG capabilities can be measured either in NCSG or traditional MG. Other frequencies can only be measured in traditional MG.

Thus, when NCSG is partially overlapping with MG, the frequencies with NCSG will be measured within the NCSG which is non-fully overlapping with MG. In another embodiment 562, only frequencies in non-overlapping MG will be measured in the MG. To maximize the benefits of NCSG, all the NCSG shall be fully utilized. When part of NCSG is overlapping with MG, all the MG which is overlapping with NCSG can be believed as a NCSG. Only the frequencies with NCSG will be measured in this gap occasions. The frequencies without NCSG will be measured within the MG which is fully non-overlapping with NCSG.

Figure 6A:
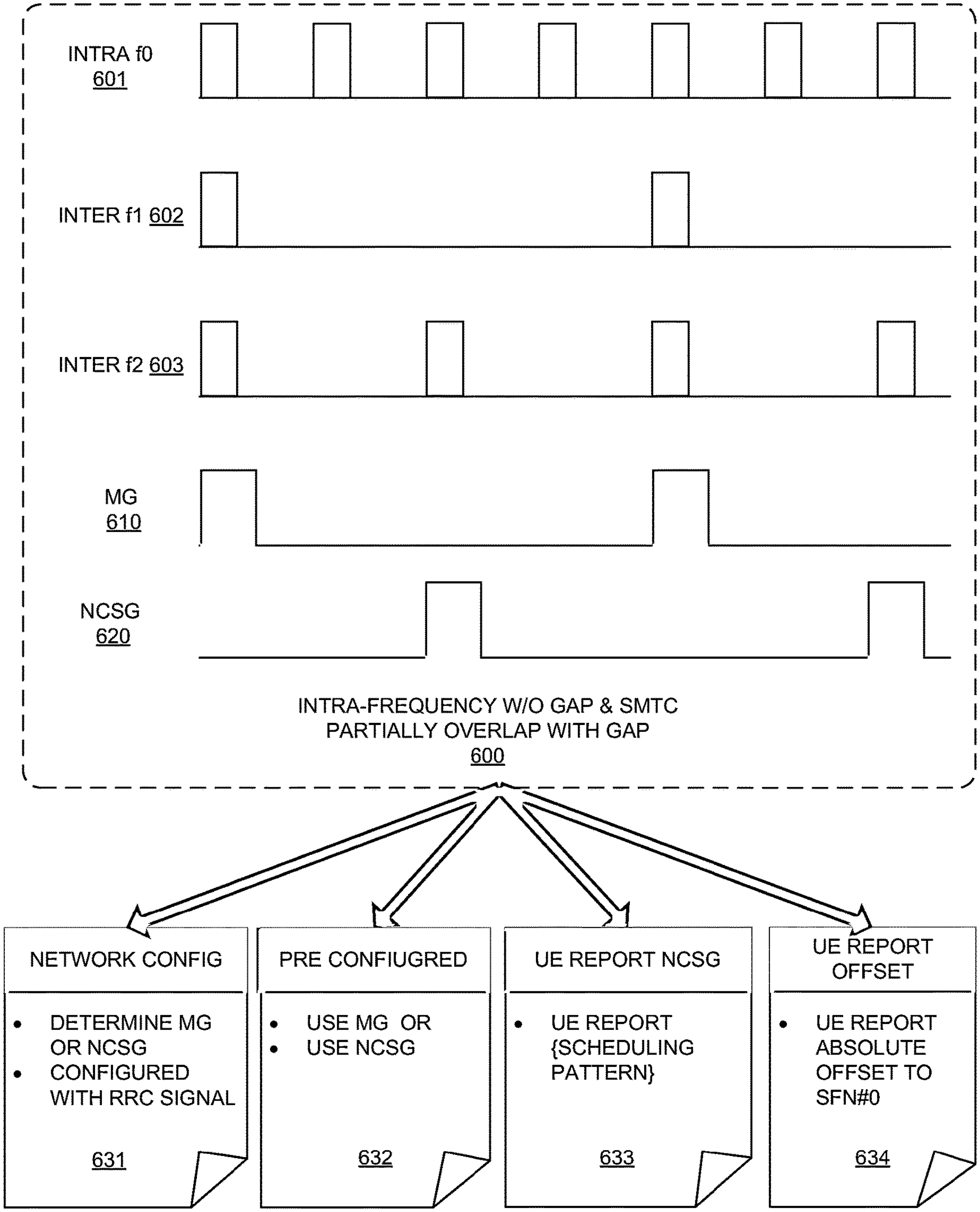
FIG. 6A illustrates top-level exemplary diagrams of the intra-frequency without gap being fully overlapped with union of legacy measurement gap and NCSG.

FIG. 6A illustrates top-level exemplary diagrams of the intra-frequency without gap being fully overlapped with union of legacy measurement gap and NCSG. Intra frequency f0 601, inter frequency f1 602 and inter frequency f2 603 have different SSB periodicities. Measurement gaps MG 610 and NCSG 620 are configured with different offset and/or periodicity. Intra frequency f0 601 is an intra-frequency without gap and SMTC of intra frequency f0 is partially overlapped with MG 610. Subsequently, NCSG 620 is configured. Intra frequency f0 601 is considered as having an SMTC fully overlapping with equivalent gap. NCSG can be believed as a special gap and the frequency layers with NCSG can be monitored within NCSG. In one embodiment, the gap definition for measurements shall be updated to include both legacy measurement gap and NCSG, which can be referred as an 'equivalent gap'. In one embodiment 631, the network configures the measurements. The NW controls the frequency layers measurement to be within legacy measurement gap MG 610 or to be measured in NCSG 620. In one embodiment, the NW send the control signal by RRC.

In another embodiment 632, the measurement configuration is predefined or preconfigured. In one embodiment, the frequency layers measurement can be performed in the MG 610. In another embodiment, the frequency layers measurement can be performed in the NCSG 620.

In yet another embodiment 633, the measurement is performed based on a UE NCSG report. The UE reports the NCSG for current bands. The UE also reports the NCSG scheduling pattern {VIRP (visible interruption reception period), VIL (visible interruption length), offset} by RRC signaling. Subsequently, the NW will know in which time occasion UE will use NCSG to measure frequencies. In another embodiment 634, the measurement is performed based on a UE report of an offset. The UE reports the absolute offset to subframe number SFN #0 to indicate which gap occasion will be used for NCSG frequency layers.

Figure 6B:
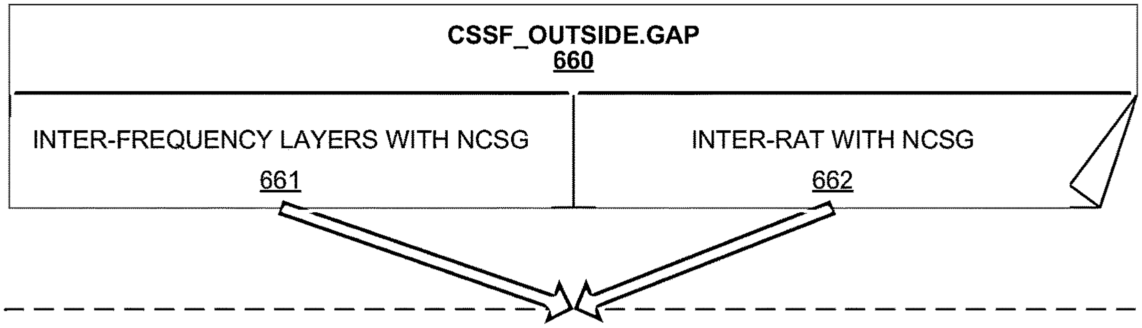
FIG. 6B illustrates exemplary diagrams for UE NCSG measurements with intra-frequency without gap being fully overlapped with union of legacy measurement gap and NCSG.
Figure 6B:
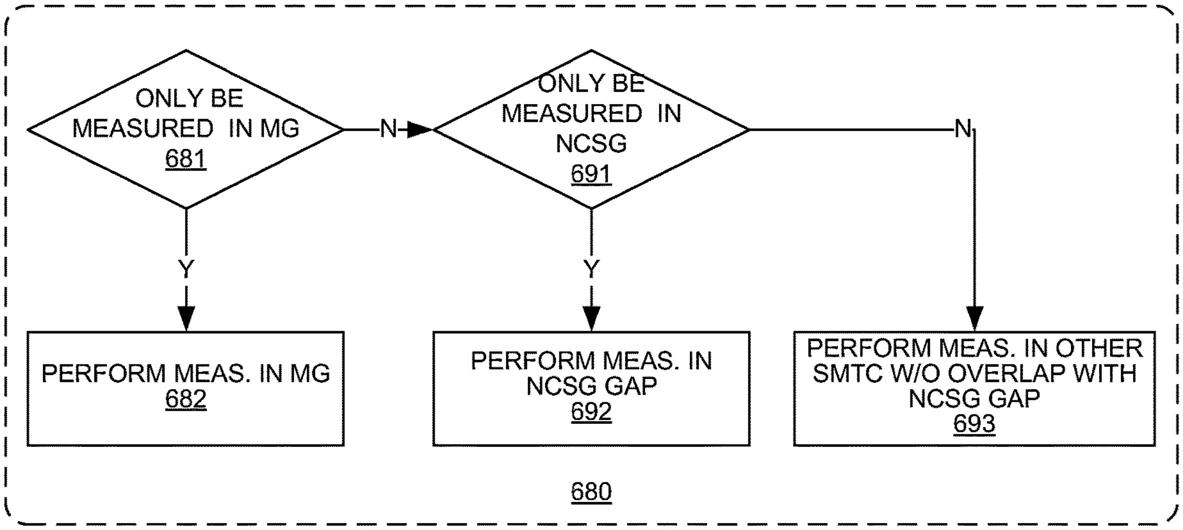

FIG. 6B illustrates exemplary diagrams for UE NCSG measurements with intra-frequency without gap being fully overlapped with union of legacy measurement gap and NCSG. The measurement within a NCSG is a parallel processing with the frequency layers measurement without gap, whose SMTC is partially overlapped or fully non-overlapped with the gap. In one embodiment 660, the carrier-specific scaling factor (CSSF) applies for scenarios inter-frequency with NCSG 661 and inter-RAT with NCSG 662.

Inter-frequency measurement with NCSG 661, which is partially overlapping or fully non-overlapping with measurement gap can be monitored outside gap. Due to searcher limitation, inter-frequency measurement with NCSG will share the same searcher with secondary component carrier (SCC). These new measurement types shall be considered in $CSSF_{outside\_gap}$ for the measurements conducted outside measurement gaps. A difference with other measurement types is the additional interruption will be still needed. Owing to NW not knowing the dedicated measurement occasions for inter-frequency layers with NCSG, the interruption to active serving cells is always needed. The interruption can always occur before or after the SMTC for the inter-frequency layers with NCSG.

E-UTRA inter-RAT measurements with NCSG 662 is monitored outside gap. These new measurements can be performed together with serving cells' Primary component carrier (PCC) and SCC measurements because no baseband searcher limitation for E-UTRA Inter-RAT measurements, but due to RF combination limitation these measurements cannot be paralleled performed with inter-frequencies and other Inter-RAT measurements. For example, there are 6 frequency layers, including f0—intra-frequency PCC, f1, f2—intra-frequency SCC, f3, f4—inter-frequency with NCSG, f5—E-UTRA inter-RAT with NCSG. When NCSG is partially or fully non-overlapping with MG, the frequency layers with NCSG shall be measured outside the legacy gap as summarized in exemplary table 670.

The measurements within NCSG can be also believed as a new type of gap which is different with measurement without gap and measurement within gap. In NR, when some frequencies can be measured both within gap and outside gap, the measurements of these frequency layers shall be performed outside gap. The reason is the number of measurement gap occasions is relatively smaller than that of SMTC occasions. These measurement gap occasions shall be reserved for the frequencies which can only be measured within the gap. The $CSSF_{within\_NCSG,i}$ applied for shall be measurement object i ($MO_i$) for the following frequencies which are measured within NCSG, including:

- The intra-frequency measurement object whose frequency belongs to the NCSG bands reporting by UE, when all of the SMTC occasions of this intra-frequency measurement object aren't fully overlapped with the measurement gap and NCSG is not fully overlapped with measurement gap;
- The inter-frequency measurement object whose frequency belongs to the NCSG bands reporting by UE, when all of the SMTC occasions of this intra-frequency measurement object aren't fully overlapped with the measurement gap and NCSG is not fully overlapped with measurement gap;
- The inter-RAT measurement object whose frequency belongs to the NCSG bands reporting by UE, when NCSG is not fully overlapped with measurement gap;
- The intra-frequency with no measurement gap which SMTC occasions are fully non-overlapping with legacy gap but fully overlapping with NCSG;
- The inter-frequency with no measurement gap which SMTC occasions are fully non-overlapping with legacy gap but fully overlapping with NCSG;
- The intra-frequency with no measurement gap which SMTC occasions are partially overlapping with legacy gap and the other occasions are fully overlapping with NCSG; or
- The inter-frequency with no measurement gap which SMTC occasions are partially overlapping with legacy gap and the other occasions are fully overlapping with NCSG.

In one embodiment, the measurement with MG, NCSG and other SMTC configured, is performed based on one or more predefined/preconfigured rules as illustrated in diagram 680. The measurement gap (MG) with interruption of MGL, will be reserved for frequencies which can only be measured within the gap. The NCSG, with interruption of VIL, reserved for the frequencies which can only be measured within the NCSG. The measurements of other frequencies, which do not need MG nor NCSG are performed in other SMTC occasions, which don't overlap with MG and NCSG. At step 681, the NW/UE checks if the frequency can only be measured in MG. If step 681 determines yes, the measurement is performed in the MG at step 682. If step 681 determines no, the NW/UE determines if the frequency can only be measured in NCSG at step 691. If step 691 determines yes, the measurement is performed in the NCSG at step 692. If step 691 determines no, the measurement is performed in other SMTC occasions which don't overlap with measurement gap and NCSG. In one embodiment, the predefined/preconfigured set of rules includes:

R1. Measurement gap will be reserved for the frequencies which can only be measured within the measurement gap;

R2. NCSG will be reserved for the frequencies in the related bands which claims as the NCSG capabilities;

R3. The measurements of other frequencies will be performed in other SMTC occasions which don't overlap with measurement gap and NCSG.

Figure 7:
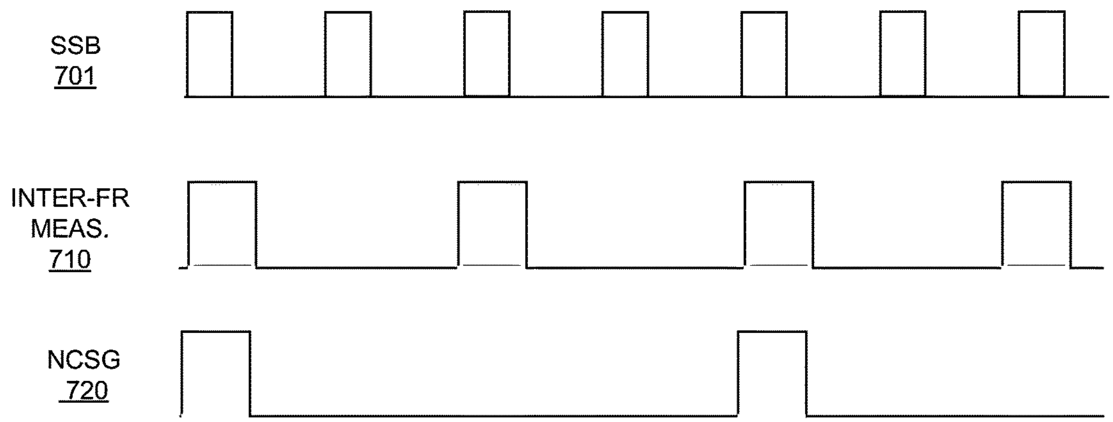
FIG. 7 illustrates exemplary diagrams for measurements in NCSG colliding with SSB occasions for L1 measurements.

FIG. 7 illustrates exemplary diagrams 700 for measurements in NCSG colliding with SSB occasions for L1 measurements. SSB 701 is configured with periodicity covered with inter-frequency measurement 710. NCSG 720 is configured for the UE. In FR1, due to omnidirectional antennas, the L3 measurements in NCSG can be performed simultaneously with L1 measurements. However, in FR2, L3 measurements in NCSG may not be performed simultaneously with L1 measurements because of Rx beam reception. The main difference with the relation between measurement gap and L1 measurements is L1 measurements can still be performed during NCSG ML. The sharing relation for NCSG, SMTC for intra-frequency measurements and L1 measurements is shown in table 730. In table 730, NCSG means the SMTC occasions for inter-frequency measurements with NCSG; Intra-frequency SMTC means the SMTC occasions for intra-frequency measurements; L1 measurements means the SSB occasion for L1 measurements.

In one embodiment, a VIRP, VIL, measurement length (ML) pattern for NR is defined. To simplify the design, the first twenty-four NR gap patterns 0-23 of the legacy system are reused for NCSG gap pattern. In NR, VIL may be different due to FR1 and FR2. 3GPP RAN4 had already defined the switching time is 0.5 ms for frequency range FR1 and 0.25 ms for frequency range FR2. Thus, we can define the VIL length is 0.5 ms for FR1 and 0.25 ms for FR2. The overall interruption length depends on aggressor cell's SCS and VIL. When UE reports the supporting gap pattern, only 1 bit for supporting NCSG can be reported. When UE supports the traditional gap patterns, it implies the UE can support the correspondent NCSG gap patterns.

Figure 8:
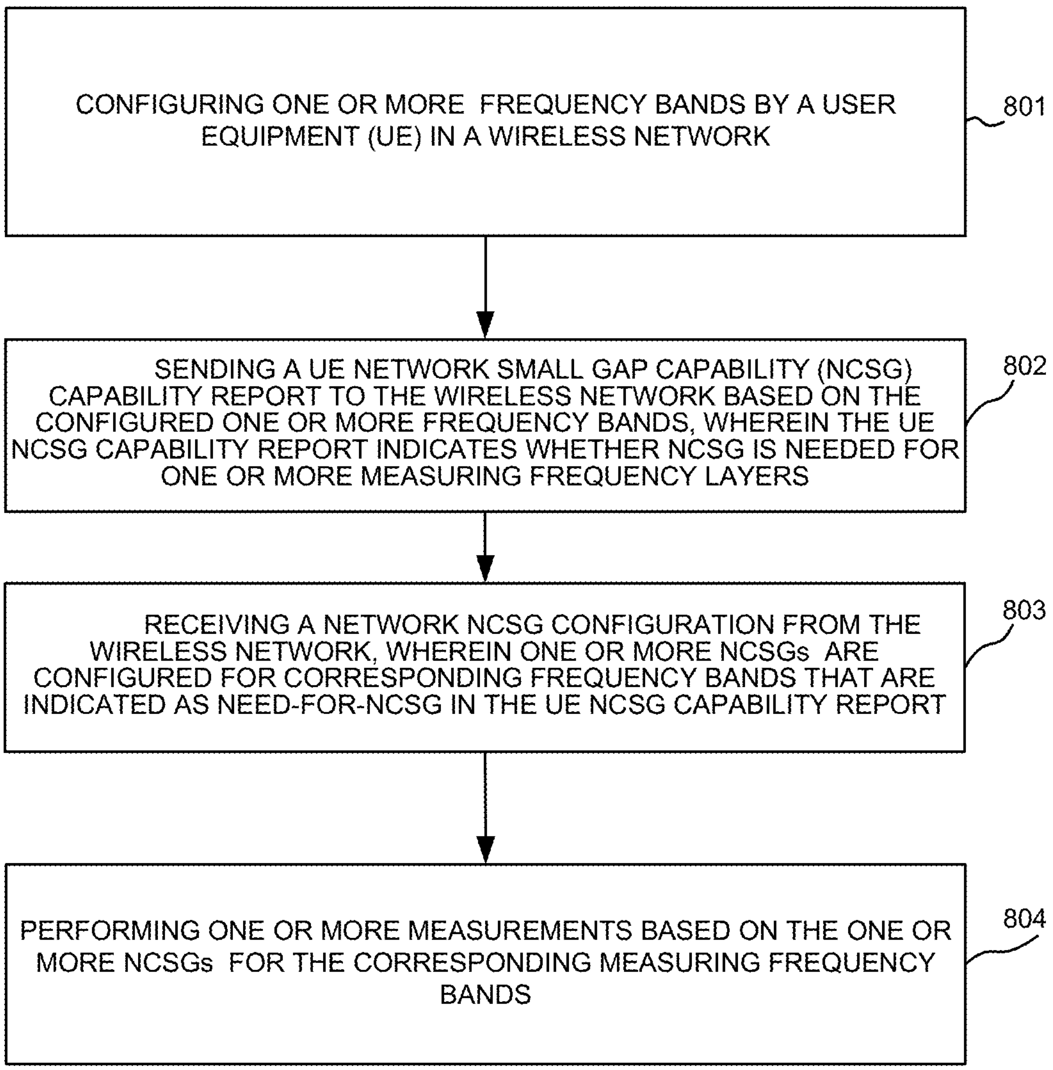
FIG. 8 illustrates an exemplary flow diagram for the NCSG capability reporting, configuration, and measurements.

FIG. 8 illustrates an exemplary flow diagram for the NCSG capability reporting, configuration, and measurements. At step 801, the UE configures one or more frequency bands in a wireless network. At step 802, the UE sends a UE network small gap capability (NCSG) capability report to the wireless network based on the configured one or more frequency layers, wherein the UE NCSG capability report indicates whether NCSG is needed for one or more measuring frequency layers. At step 803, the UE receives a network NCSG configuration from the wireless network, wherein one or more NCSGs are configured for corresponding frequency layers that are indicated as need-for-NCSG in the UE NCSG capability report. At step 804, the UE performs one or more measurements based on the one or more NCSGs for the corresponding measuring frequency layers.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

configuring one or more frequency bands by a user equipment (UE) in a wireless network;

sending a UE network controlled small gap (NCSG) capability report to the wireless network based on the configured one or more frequency bands, wherein the UE NCSG capability report indicates whether NCSG is needed for one or more measuring frequency layers;

receiving a network NCSG configuration from the wireless network, wherein one or more NCSGs are configured for corresponding frequency bands that are indicated as need-for-NCSG in the UE NCSG capability report; and performing one or more measurements based on the one or more NCSGs for the corresponding measuring frequency bands, wherein the UE performs intra-frequency measurements without gap in parallel with one or more measurements for inter-frequency bands within corresponding configured NCSG when corresponding frequency bands belong to frequency range-1 (FR1) or independent beam management (IBM) bands on frequency range-2 (FR2).

2. The method of claim 1, wherein the network NCSG configuration is received from a master node (MN) or a secondary node (SN) of the wireless network.

3. The method of claim 1, wherein the NCSG capability report uses a NeedForGap signaling framework to indicate NCSG capabilities for the one or more measuring frequency layers.

4. The method of claim 1, wherein the UE NCSG capability report further comprises a beam management type for each corresponding frequency band in frequency range-2 (FR2).

5. The method of claim 1, wherein the UE performs layer-1 (L1) measurements without gap in parallel with one or more measurements for inter-frequency bands within corresponding configured NCSG when corresponding frequency bands belong to FR1 or independent beam management (IBM) bands on FR2.

6. The method of claim 1, wherein an inter-radio access technology (RAT) measurement is performed on one configured NCSG in parallel with intra-frequency measurements for a primary cell (PCell) and secondary cell (SCell) of the UE.

7. The method of claim 1, wherein one configured NCSG overlaps with a configured measurement gap of the UE.

8. The method of claim 7, wherein the UE receives a radio resource control (RRC) signal indicating priority information for the overlapped measurement gap and the NCSG.

9. The method of claim 7, wherein the UE prioritizes the overlapped measurement gap or the NCSG based on predefined rules.

10. The method of claim 1, wherein carrier specific scaling factor (CSSF) is configured for each corresponding measurement object (MO) with corresponding NCSG, and wherein each CSSF applies based on NCSG MO configuration and other MO configurations of the UE.

11. A user equipment (UE), comprising:

a transceiver that transmits and receives radio frequency (RF) signals in a wireless network;

a frequency configuration module that configures one or more frequency bands in the wireless network;

a network controlled small gap (NCSG) capability module that sends a UE NCSG capability report to the wireless network based on the configured one or more frequency bands, wherein the UE NCSG capability report indicates whether NCSG is needed for one or more measuring frequency layers;

a NCSG control module that receives a network NCSG configuration from the wireless network, wherein one or more NCSGs are configured for corresponding frequency bands that are indicated as need-for-NCSG in the UE NCSG capability report; and a measurement module that performs one or more measurements based on the one or more NCSGs for the corresponding measuring frequency bands, and performs intra-frequency measurements without gap in parallel with one or more measurements for inter-frequency bands within corresponding configured NCSG when corresponding frequency bands belong to frequency range-1 (FR1) or independent beam management (IBM) bands on frequency range-2 (FR2).

12. The UE of claim 11, wherein the network NCSG configuration is received from a master node (MN) or a secondary node (SN) of the wireless network.

13. The UE of claim 11, wherein NCSG capability report uses a NeedForGap signaling framework to indicate NCSG capabilities for the one or more measuring frequency layers.

14. The UE of claim 11, wherein the UE NCSG capability report further comprises a beam management type for each corresponding frequency band in frequency range-2 (FR2).

15. The UE of claim 11, wherein the UE performs layer-1 (L1) measurements without gap in parallel with one or more measurements for inter-frequency bands within corresponding configured NCSG when corresponding frequency bands belong to FR1 or independent beam management (IBM) bands on FR2.

16. The UE of claim 11, wherein an inter-radio access technology (RAT) measurement is performed on one configured NCSG in parallel with intra-frequency measurements for a primary cell (PCell) and secondary cell (SCell) of the UE.

17. The UE of claim 11, wherein one configured NCSG overlaps with a configured measurement gap of the UE, and wherein the UE receives a radio resource control (RRC) signal indicating priority information for the overlapped measurement gap and the NCSG.

18. The UE of claim 11, wherein one configured NCSG overlaps with a configured measurement gap of the UE, and wherein the UE prioritizes the overlapped measurement gap or the NCSG based on predefined rules.

* * * * *